United States Patent [19]
Min

[11] Patent Number: 5,377,926
[45] Date of Patent: Jan. 3, 1995

[54] TAPE TENSION REGULATOR

[75] Inventor: Young-hoon Min, Suwon, Rep. of Korea

[73] Assignee: Samsung Electronics Co., Ltd., Kyungki-do, Rep. of Korea

[21] Appl. No.: 102,043

[22] Filed: Aug. 4, 1993

[30] Foreign Application Priority Data

Oct. 6, 1992 [KR] Rep. of Korea ............. 92-19059

[51] Int. Cl.[6] ........................................... B65H 23/26
[52] U.S. Cl. ............................. 242/334.6; 242/413.3; 242/419.1; 242/419.9
[58] Field of Search ............... 242/413.3, 419.1, 419.9, 242/334.6; 226/39

[56] References Cited

U.S. PATENT DOCUMENTS

| | | | |
|---|---|---|---|
| 1,836,613 | 12/1931 | Oehmichen | 242/419.1 |
| 2,314,070 | 3/1943 | Bogoslowsky | 242/419.1 |
| 2,317,250 | 4/1943 | Bridges | 242/419.1 |
| 4,030,131 | 6/1977 | Beiter et al. | 242/419.9 |

Primary Examiner—Daniel P. Stodola
Assistant Examiner—John Q. Nguyen
Attorney, Agent, or Firm—Sughrue, Mion, Zinn, Macpeak & Seas

[57] ABSTRACT

A tape tension regulator automatically adjusts for minute variations of tension which are inevitably imposed upon a wound tape during its procession, thereby ultimately reproducing information having high picture quality and good sound quality. The tape tension regulator includes a guide roller having a fixing shaft and upper and lower flanges, a minute tension arm one end of which is connected to the fixing shaft of the guide roller, and the other end of which is connected to be rotatable around an arm-fixing shaft, a minute tension spring connected to a portion of the minute tension arm and a wire pole positioned in the opposite side of the minute tension spring with respect to the minute tension arm for retaining a belt-type wire in cooperation with the lower flange of the guide roller.

2 Claims, 3 Drawing Sheets

TAPE TENSION REGULATOR

BACKGROUND OF THE INVENTION

The present invention relates to a tape tension regulator, and more particularly to a tape tension regulator for automatically adjusting for minute variations of tension which have heretofore been difficult to control with conventional tape tension regulators, thereby providing improved picture and sound qualities when applied to electronic apparatuses.

In electronic apparatuses for recording and reproducing information using a magnetic tape as a medium, there are several factors which ultimately determine picture and sound qualities. For example, besides the inferiority of various electronic components and circuit devices constituting an electronic appliance, which undoubtedly result in poor picture and sound qualities, an improper voltage supply, the electromagnetic influence of nearby high-voltage cables, and deteriorated magnetic tape can be given as contributors. In addition to these, certain trivial factors may have a significant affect; one being tension of the magnetic tape. In other words, while performing rotational motion, rectilinear motion or a certain curvilinear motion combining the two, the magnetic tape in an electronic apparatus as above contacts a guide roller and various poles installed along its travelling path, to thereby cause friction between these, which thus applies tension to the tape. Here, if, for some reason, an unnecessarily burdensome or, contrarily, a too slight tension is applied, the tape speed becomes irregular, making the detected signal amount vary per predetermined time periods. As a result, a highly clear picture quality and/or sound quality cannot be obtained. This mechanism in connection with the tension on a tape is illustrated in FIG. 1.

FIG. 1 schematically shows a conventional tape tension regulator, wherein a tape 1 travels by way of a supply-reel 7, a tension pole 3 and a guide roller 2. At this time, tape 1 is held taut by the tension which is increased when tape 1 passes the guide device, i.e., tension pole 3 and guide roller 2. The tension becomes increased especially when the contact surface is a common fixed-type contact surface, like tension pole 3 which is not a roller. In this state, if the tension applied to tension pole 3 is stronger than a proper tension, tension pole 3 is forced in the direction of an arrow D, so that a tension arm 4 connected to tension pole 3 is rotated clockwise around a rotating shaft P overcoming the resilient force of spring 8. Then, a tension band 5 connected to tension arm 4 loosens, thus releasing a brake lining 6 attached thereto, which facilitates the rotation of supply-reel 7. Therefore, the overly strong tension is weakened. Meanwhile, if the tension applied to tension pole 3 is weaker than the proper tension, tension arm 4 rotates counter-clockwise by means of the elastic restoring force of tension spring 8 to thereby draw tension band 5, so that brake lining 6 is tightened to brake the rotation of supply-reel 7 to some degree. By this operation, the relatively weak tension is strengthened, thereby maintaining the proper level.

As described above, the conventional tension regulator serves for automatically adjusting the tape tension by means of the elasticity of tension spring 8. However, the tension applied to the tape is wholly increased across the tape according to the variations of the tape take-up state, i.e., according to the progress from the initial, middle to last stag of the take-up. Also, even though insignificant, the tension inevitably varies due to external disturbances and accuracy of supply-reel 7. This slightly varied tension cannot be controlled by the conventional tension regulator.

SUMMARY OF THE INVENTION

The present invention is devised to solve the above-described problems. It is the object of the present invention to provide a tape tension regulator for automatically adjusting the minutely varied tension which is necessarily accompanied during tape travel, thereby providing very good picture and sound qualities.

To achieve the above object of the present invention, there is provided a tape tension regulator comprising:
- a guide roller having a fixing shaft and upper and lower flanges;
- a minute tension arm one end of which is connected to the fixing shaft of the guide roller, and the other end of which is connected to be rotatable around an arm-fixing shaft;
- a minute tension spring connected to a portion of the minute tension arm; and
- a wire pole positioned on the opposite side of the minute tension spring with respect to the minute tension arm for retaining a belt-type wire in cooperation with the lower flange of the guide roller.

Therefore, in the tape tension regulator according to the present invention, minute variation of the tension which has heretofore been difficult to control, is automatically adjusted, so that the tape travelling speed is stabilized to thereby maintain high picture quality and good sound quality.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

Figure 1:
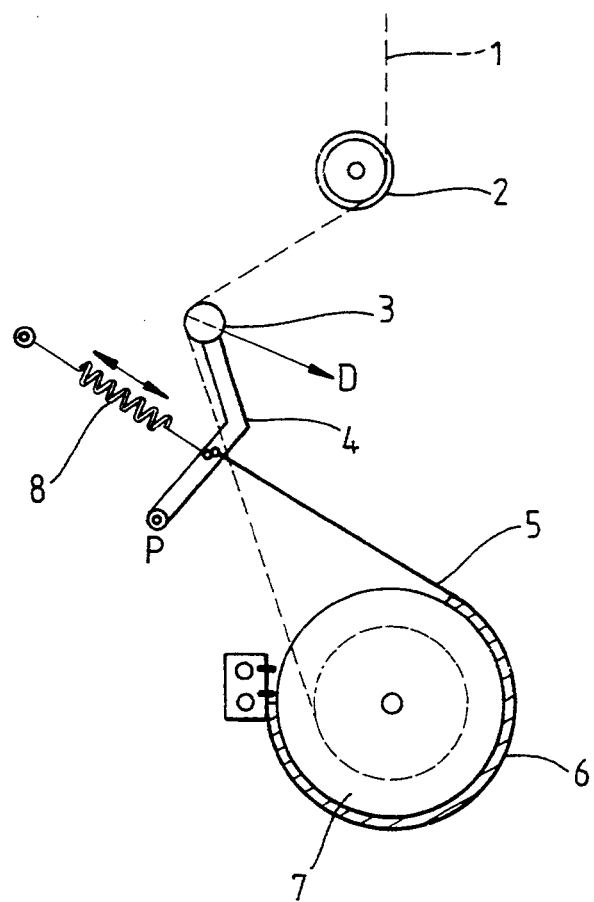
FIG. 1 schematically shows the structure of a conventional tape tension regulator.
Figure 2:
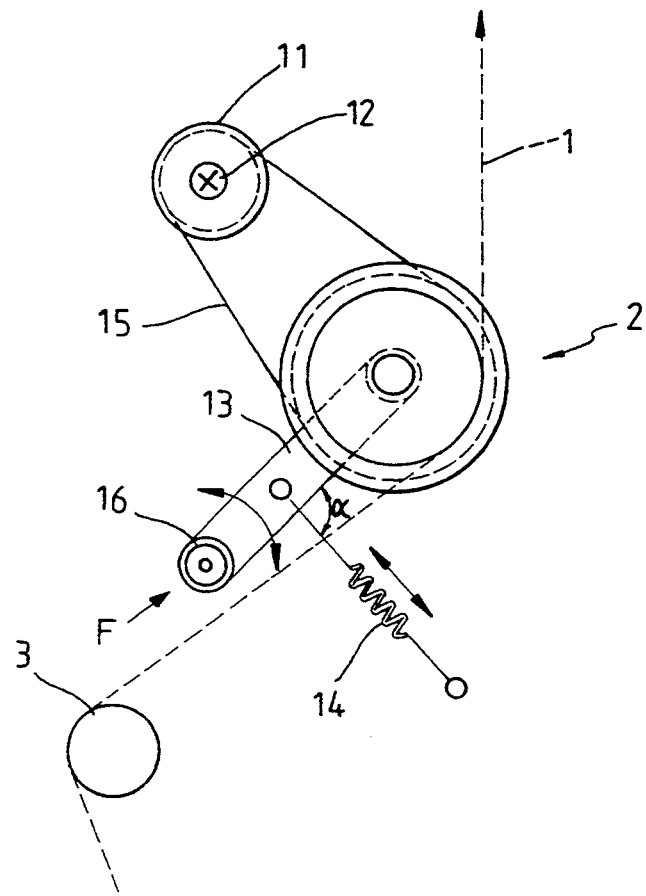
FIG. 2 is a plan view showing a tape tension regulator according to the present invention.
Figure 3:
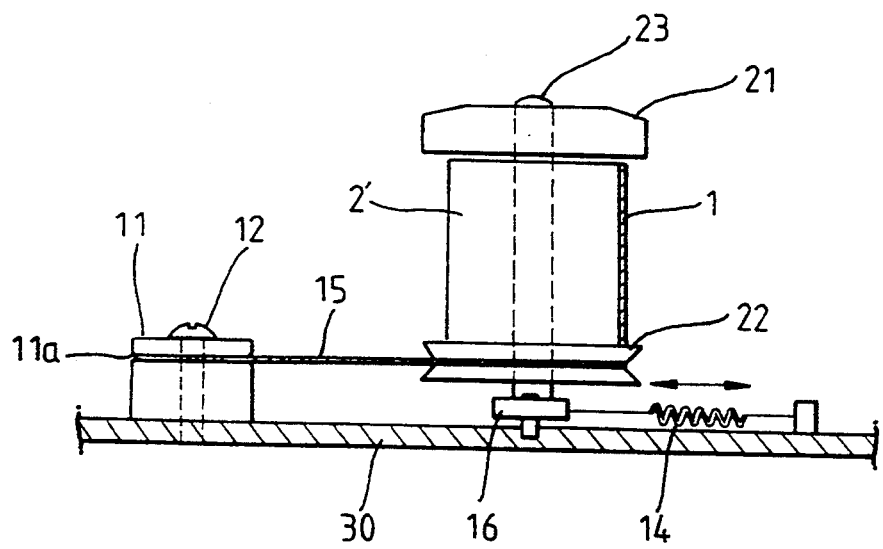
FIG. 3 is a front view showing the tape tension regulator according to the present invention, which corresponds to FIG. 2 when viewed in the direction indicated by an arrow F.

FIGS. 2 and 3 schematically illustrate a tape tension regulator according to the present invention. Referring to these figures, a guide roller 2 for supporting a tape 1 in its center is formed of an upper flange 21, a roller 2' and a lower flange 22. Also, a roller-fixing shaft 23 is inserted along the central axis of guide roller 2, to thereby be connected to one end of a minute tension arm 13 at the lower portion of lower flange 22. Meanwhile, in order to be rotatable around a minute tension arm-fixing shaft 16, one end of minute tension arm 13 is connected to roller-fixing shaft 23 at a right angle, and the other end thereof is fixed by minute tension arm-fixing shaft 16. Also, a minute tension spring 14 is connected to a portion of minute tension arm 13 spaced apart from arm-fixing shaft 16 and forms a predetermined angle α with respect to minute tension arm 13. A cylindrical wire pole 11 is vertically fixed into a baseplate 30 using a screw 12 as a fixing shaft and is positioned on the opposite side of minute tension spring 14 with respect to minute tension arm 13 while being spaced apart from guide roller-fixing shaft 23. A groove 11a having a predetermined depth is formed along the upper circumference of wire pole 11. In addition, a belt-type wire is wound along both groove 11a and a V-shaped channel formed in lower flange 22 integrally formed with roller 2'.

Figure 4:
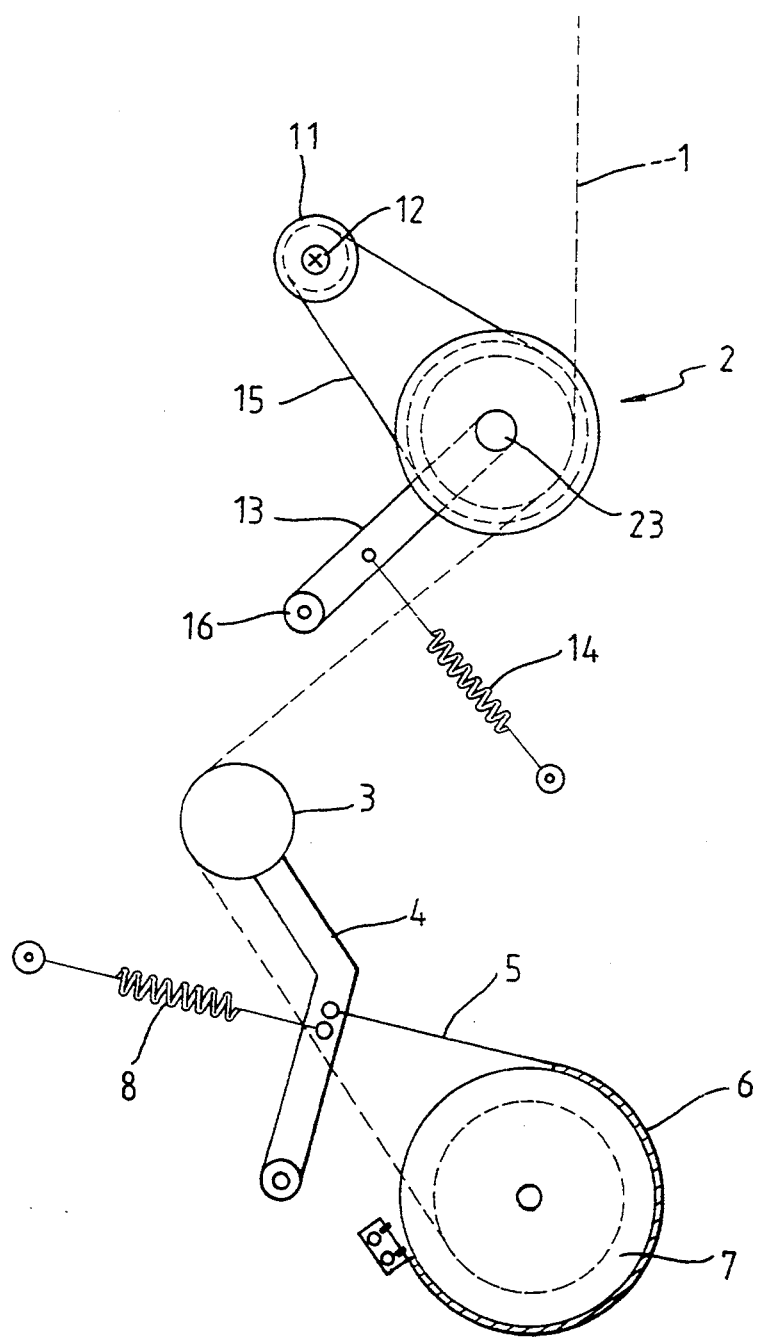
FIG. 4 is a plan view showing the arrangement of the tape tension regulator according to the present invention when actually applied.

FIG. 4 is a view showing the arrangement of the tape tension regulator according to the present invention when actually applied. Referring to FIG. 4, the operation of each component when the tape actually travels along the above-described tape tension regulator according to the present invention will be described hereinbelow.

A tension of a certain intensity is necessarily imposed upon tape 1 travelling in contact with the circumference of guide roller 2 due to the contact-travelling of components around guide roller 2. At this time, if ever the tension applied on tape 1 is increased, e.g., if the contact-pressure imposed on guide roller 2 is increased, guide roller 2 rotates counter-clockwise while centering on minute tension arm-fixing shaft 16. Then, the distance between the axes of wire pole 11 and guide roller 2 is shortened, and a wire 15 commonly coiling around groove 11a in wire pole 11 and the channel of lower flange 22 (FIG. 3) of the guide roller is slightly loosened, so that the frictional force imposed upon lower flange 22 by wire 15 is lessened. Therefore, the rotation of guide roller 2 is facilitated, which decreases the tension imposed on the tape. Contrarily, when the tension on tape 1 is weakened, minute tension arm 13 connected to spring 14 rotates clockwise centering on fixing shaft 16 by means of the elastic restoring force which in turn lengthens the distance between wire pole 11 and guide roller shaft 23. Therefore, wire 15 is more closely fitted into the channel of lower flange 22. Then, the contact-frictional force is increased and brakes the rotation of guide roller 2 slightly, which increases the tension applied to tape 1, so that the tension applied to the tape maintains a proper level.

In the tape tension regulator according to the present invention as described above, the minute variation of the tension which has heretofore been difficult to control in the conventional tape tension regulator is automatically adjusted, so that the tape speed is stabilized, which enables information reproduction having enhanced high picture quality and good sound quality.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A tape tension regulator comprising:
   a guide roller having a fixing shaft and upper and lower flanges;
   a minute tension arm, one end of which is connected to said fixing shaft of said guide roller, and the other end of which is connected to be rotatable around an arm-fixing shaft;
   a minute tension spring connected to a portion of said minute tension arm to apply a spring bias to said arm; and
   a wire pole positioned on the opposite side of said minute tension arm with respect to said minute tension string for retaining an endless belt-type wire which is also wrapped around said lower flange of said guide roller.

2. A tape tension regulator as claimed in claim 1, wherein a V-shaped channel is formed along the circumference of said lower flange of said guide roller to received said belt-type wire.

* * * * *